Patented Jan. 25, 1949

2,460,195

UNITED STATES PATENT OFFICE 2,460,195

PROCESS FOR THE POLYMERIZATION OF 4-VINYLCYCLOHEXENE DIOXIDE

Gordon Hart Segall, McMasterville, Quebec, Canada, assignor to Canadian Industries Limited, Montreal, Quebec, Canada, a corporation of Canada No Drawing. Application August 5, 1947, Serial No. 766,455. In Canada April 19, 1947

4 Claims. (Cl. 260—2)

This invention relates to a process for the polymerization of 4-vinylcyclohexene dioxide and, more particularly, to an improved process for obtaining hard, clear, colorless polymers of 4-vinylcyclohexene dioxide.

In U. S. application Ser. No. 743,198, filed April 22, 1947, in the names of O. C. W. Allenby and G. J. Harris, assigned to the assignee of the instant application, the preparation of 4-vinylcyclohexene dioxide from 4-vinylcyclohexene by the formation of the corresponding dichlorohydrin followed by dehydrohalogenation, is disclosed. Further, U. S. application Ser. No. 766,-453, filed of even date herewith in the name of O. C. W. Allenby, assigned to the assignee of the instant application, discloses a method of polymerizing 4-vinylcyclohexene dioxide in the presence of a catalyst. The polymerization of 4-vinylcyclohexene dioxide as disclosed in said application is relatively difficult of control and there is a need for a process whereby hard, clear, colorless solid polymers of 4-vinylcyclohexene dioxide may be obtained more readily and uniformly.

It is, therefore, an object of this invention to provide an improved process for obtaining clear, hard colorless solid polymers of 4-vinylcyclohexene dioxide. Another object of this invention is to provide a new catalyst for the polymerization of 4-vinylcyclohexene dioxide. Still another object of this invention is to provide an improved process for polymerizing 4-vinylcyclohexene dioxide. Other objects of this invention will become apparent from an examination of the following description and claims.

These objects are accomplished according to the invention hereinafter described which broadly comprises polymerizing 4-vinylcyclohexene dioxide in the presence of perchloric acid. A more specific and preferred embodiment of the invention comprises heating at a temperature between 20° and 100° C. 4-vinylcyclohexene dioxide to which has been added a catalytic amount of perchloric acid.

The invention will be more clearly understood from the following examples which in no way limit the invention but are for the purposes of illustration only, and in which all proportions are by weight unless otherwise stated.

Example I

To 10 parts of 4-vinylcyclohexene dioxide was added with stirring 0.02 part perchloric acid as a 9% solution in acetic acid while maintaining the temperature at 0° C. This solution was slowly warmed to 30° C. and held at this temperature by external cooling since the polymerization reaction is exothermic, until it had gelled. The temperature was held at this point for a further two hours and then slowly raised to 65° C. A clear, colorless solid polymer was obtained at the end of about eighteen hours.

Example II

To 10 parts 4-vinylcyclohexene dioxide were added 0.002 part perchloric acid as a 3% solution in dioxane. This was then heated at a temperature of 85° for eighteen hours. The product obtained was a hard, clear, colorless solid polymer.

Example III

To 10 parts of 4-vinylcyclohexene dioxide was added between 0.01 and 0.02 part of perchloric acid as a between 9% and 10% solution in acetic acid while carefully maintaining the temperature at 0° C. Upon warming gradually and slowly to a temperature of 30° C. the 4-vinylcyclohexene dioxide set to a gel. The temperature was raised over a period of 1 hour to 50° C. and the gel was maintained at that temperature for a period of from 12 to 18 hours until the polymer becomes hard. This was then given a further hardening treatment by heating for 1 hour at a temperature of 85° C.

Example IV

To 10 parts of 4-vinylcyclohexene dioxide was added between 0.01 and 0.02 part of perchloric acid as a between 9% and 10% solution in acetic acid while carefully maintaining the temperature at 0° C. This was then heated at a temperature of 50° C. for between 2 to 3 hours and then at a temperature of 90° C. for 2 hours to form a hard, clear, colorless solid polymer.

Example V

To 10 parts of 4-vinylcyclohexene dioxide was added 0.02 part perchloric acid as a 9% solution in acetic acid while maintaining the temperature at 0° C. The whole was then allowed to stand at room temperature. After 4 days the 4-vinylcyclohexene dioxide had set to a hard, clear colorless solid.

The products obtained by the polymerization of 4-vinylcyclohexene dioxide in the presence of perchloric acid are hard, clear, colorless thermosetting solids which remain undamaged after standing for long periods in cold concentrated sulphuric acid, hot 30% sulphuric acid or hot 30% sodium hydroxide. They become discolored, however, after several hours at a temperature of 100° C. in glacial acetic acid. None of the common organic solvents dissolve these polymers. These solid polymers may be colored by adding some suitable dye to the monomer and then polymerizing. They are readily machined and polished. They can be formed into desired shapes by introducing the monomer into a mold and polymerizing. Clear, colorless solid polymers can readily be produced by the process of this invention which have a density of 1.19, a Rockwell hardness of M109 and a refractive index of 1.53.

The polymerization of 4-vinylcyclohexene dioxide in the presence of perchloric acid must be carried out under controlled conditions. The polymerization reaction is exothermic and it is, therefore, necessary to externally cool the reaction mixture when the catalyst is being added and during polymerization. If this is not done the temperature of the reaction mass may rise very rapidly (even causing the mixture to boil) and produce unsatisfactory products. The rapidity with which polymerization takes place depends upon the concentration of the catalyst and upon the temperature at which the polymerization is conducted. Low concentrations of perchloric acid and/or low temperatures of polymerization require prolonged periods before clear, colorless solids are obtained. On the other hand, high concentration of perchloric acid and/or high temperatures of polymerization while bringing about the formation of solid polymers rapidly, are apt to produce crazing.

The concentration of perchloric acid may range from 0.0001% to 10% by weight of the 4-vinylcyclohexene dioxide. The preferred range of concentration however is from 0.02% to 2%.

It is preferred that the perchloric acid be dissolved in some inert liquid which is a solvent for the perchloric acid. This is not necessary but the perchloric acid is such a strong polymerization catalyst that, if added undiluted, difficulty may be encountered due to lack of uniformity of the rate of polymerization throughout the reaction mass. As a matter of convenience and to promote a uniform, controlled polymerization reaction, the perchloric acid will usually be added in the form of a dilute solution in an inert solvent. The term "inert solvent" is used herein in its ordinary sense denoting a solvent which does not attack the perchloric acid nor functions per se as a polymerization catalyst nor otherwise interferes with the polymerization reaction.

Acetic acid and dioxane, illustrated in the examples, are readily available and suitable solvents for the perchloric acid but any solvent for the perchloric acid and inert thereto may be used. It will be appreciated that the amount of solvent actually added to the 4-vinylcyclohexene dioxide monomer will usually be exceedingly small so that inertness to the monomer, short of acting as a polymerization catalyst is of no real consideration.

The polymerization of 4-vinylcyclohexene dioxide in the presence of perchloric acid may be carried out while maintaining the polymerizing mass at temperatures ranging from 0° C. to 150° C. but the preferred range of temperatures is from 20° C. to 100° C.

As many apparently widely different embodiments of this invention may be made without departing from the spirit and scope thereof it is understood that I do not limit myself to any specific embodiments except as defined in the appended claims.

I claim:

1. Process for the polymerization of 4-vinylcyclohexene dioxide which comprises maintaining 4-vinylcyclohexene dioxide at a temperature of 0°–150° C. in the presence of 0.0001%–10%, by weight thereof, of perchloric acid until said 4-vinylcyclohexene dioxide is polymerized.

2. Process for the polymerization of 4-vinylcyclohexene dioxide which comprises maintaining 4-vinylcyclohexene dioxide at a temperature of 0°–150° C. in the presence of 0.02%–2%, by weight thereof, of perchloric acid until said 4-vinylcyclohexene dioxide is polymerized.

3. Process as recited in claim 1 wherein said 4-vinylcyclohexene dioxide is maintained at a temperature of 20°–100° C.

4. Process as recited in claim 2 wherein said 4-vinylcyclohexene dioxide is maintained at a temperature of 20°–100° C.

GORDON HART SEGALL.

No references cited.